United States Patent Office 3,732,200
Patented May 8, 1973

3,732,200
POLYAMIDE ACIDS OF CERTAIN TETRACARBOXYLIC ACIDS AND CERTAIN AZO CONTAINING DIAMINES
Hartwig C. Bach, Pensacola, Fla., assignor to Monsanto Company, St. Louis, Mo.
No Drawing. Continuation-in-part of application Ser. No. 792,823, Jan. 21, 1969. This application June 15, 1970, Ser. No. 46,454
Int. Cl. C08g *20/22, 20/32*
U.S. Cl. 260—144                    1 Claim

ABSTRACT OF THE DISCLOSURE

Ordered fiber-forming polyamide acids and polyimides of the following respective formulas

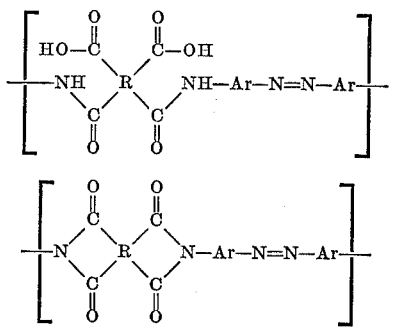

R is tetravalent aromatic radical, Ar is an asymmetrical divalent aromatic radical with the proviso that one Ar radical is the mirror image of the other. These polymers are useful as coatings, films, fibers, foams and resins.

CROSS REFERENCE TO RELATED APPLICATION

This application is a continuation-in-part application of application Ser. No. 792,823, filed Jan. 21, 1969 (now abandoned).

BACKGROUND OF THE INVENTION

This invention relates to a novel class of polyamide acids, the corresponding polyimides and to fibers, films and other shaped articles derived therefrom.

More particularly, the invention relates to the preparation of fiber and film forming polyamide acids and polyamides from a particular class of symmetrical aromatic azo diamines.

The ordered azo aromatic polyamide acids and polyimides of this invention can be prepared by conventional polymerization and cyclization techniques to provide products having improved mechanical and thermal properties.

SUMMARY

The novel fiber and film forming polyamide acids and polyimides of this invention are respectively represented by the following structural formulas:

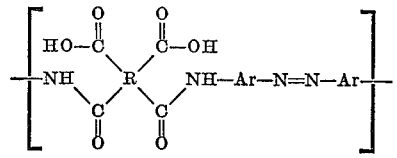

and

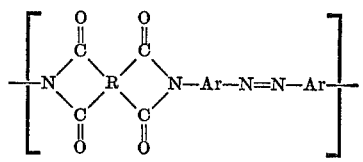

where R represents a tetravalent aromatic radical having paired valence bonds on adjacent cyclic carbon atoms. Ar is free of substituents reactive with carboxylic anhydride groups. Each Ar represents an asymmetrical divalent aromatic radical. Also, one Ar radical is the mirror image of the other Ar radical.

DETAILED DESCRIPTION

The polyamide acids above described may be conveniently prepared by the polymerization of an aromatic acid dianhydride with diamines hereafter described whereupon the thus formed polyamide acids can be thermally or chemically dehydrated to form the corresponding polyimides.

The symmetrical diamine reactants employed in the preparation of the novel polymers of this invention are represented by the formula $$NH_2-Ar-N=N-Ar-NH_2$$

wherein each Ar represents an asymmetrical divalent aromatic radical which may be a single ring, a fused ring or a multinuclear aromatic ring system which can be carbocyclic or heterocyclic. One Ar is the mirror image of the other. The aromatic ring systems are those characterized by having benzenoid unsaturation which exhibit resonance in the classic sense, including radicals derived from benzene, naphthalene or bridged diphenyls such as diphenyl sulfone and diphenyl ether. The heterocyclic radicals may contain one or more heteroatoms such as

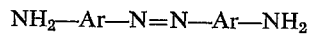

representative of which are those derived from pyridine, oxadiazole, thiazole, imidazole, pyrimidine and the like. Where Ar represents a multi-ring system the rings may be connected through aromatic carbon to aromatic carbon valence bonds or through groups such as

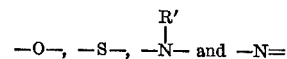

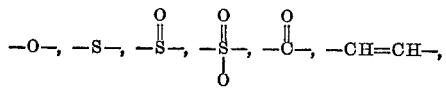

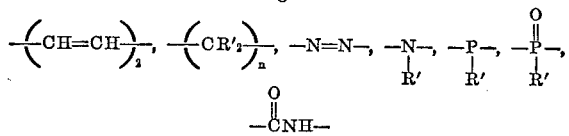

wherein R' represents hydrogen or a lower alkyl radical and *n* represents an integer of from 1 to 6. Asymmetric divalent radicals Ar may result from the presence of a substituent group on a radical such as

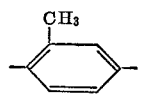

and

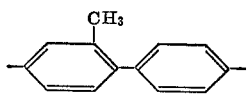

from an asymmetric arrangement of valence bonds on a radical such as,

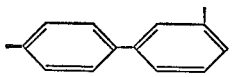

where a linking group imposes asymmetry on an otherwise symmetrical radical such as,

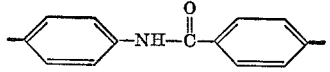

and combinations of one or more of these factors such as

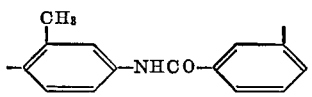

Typical examples of the various types of asymmetrical Ar radicals useful in the preparation of diamine monomers of the general process of this invention are represented by the following formulas:

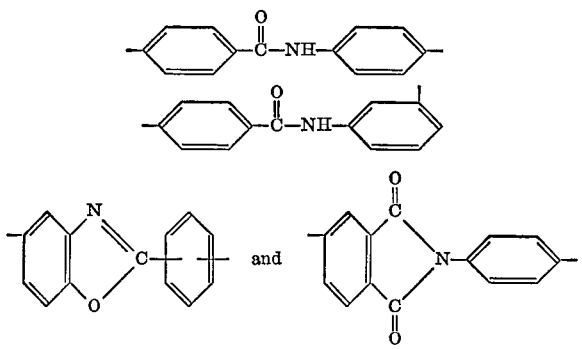

Other suitable asymmetrical heterocyclic Ar radicals include those derived from aromatic heterocyclic nuclei such as pyridine, pyrazine, thiazole, oxazoline, benzoxazole, triazole, furan and combinations of this type. Examples of such asymmetric diamines include the following:

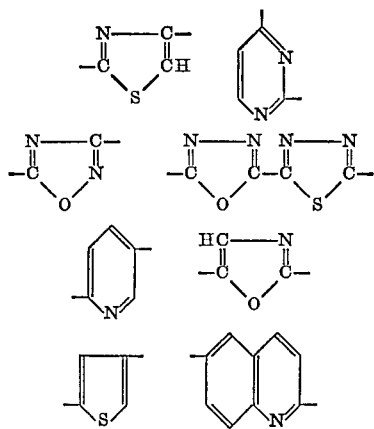

The asymmetrical reactant diamines employed to prepare the azo diamines used in this invention are generally known in the art and can be prepared by means already known to those skilled in the art.

The asymmetrical, aromatic azo diamines employed in the process of this invention can be prepared by the oxidative coupling of asymmetrical aromatic diamines in solution utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that is capable of existing in the cupric state. The particular salt used has no effect on the type of product obtained. Typical examples of cuprous salts suitable for the process are cuprous chloride, cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base complexes with the most reactive of the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the most reactive amine group of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethylamine, tributylamine, diethylmethylamine, and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium and may be used in combination with one of the aforementioned bases. Other inert solvents which do not interfere with the catalyst or are not oxidized to any appreciable extent by it may also be used as the reaction medium. It was found, in the course of this work that reaction media in which the products of the reduction are relatively insoluble lead to a cleaner, simpler separation of product from catalyst and by-products, thus increasing the yield of symmetrical diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

The order of addition of the various reactants is not critical. In one preferred mode of carrying out this invention, the catalyst may be prepared by oxidizing cuprous chloride in a base such as pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about −30° C. to about 120° C., preferably from about −20° C. to about 70° C. It has been found that the catalyst preparation may be carried out conveniently and preferably at room temperature. The rate of reaction is satisfactory at these temperatures and a very efficient catalyst is produced.

The surprising feature of the oxidative coupling reaction is that the dimer product obtained is essentially the only product resulting from the process.

Determination of the basicities of the amino groups of the starting diamine and the product can be helpful in predicting suitable conditions for carrying out the reaction. In general, as the difference in basicity between the amino groups of the starting material and the product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The preparations of several symmetrical aromatic azo diamines are hereinafter illustrated in greater detail.

The ordered condensation polymers of this invention may be prepared by reacting an azo-aromatic diamine, above described, with an aromatic acid dianhydride. Suitable aromatic acid dianhydrides, which may be used, are those generally known in the art and represented by the general formula:

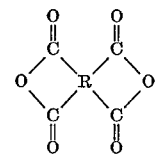

The preferred aromatic acid dianhydrides, suitable for use in the present invention, are those in which the four carbonyl groups of the anhydride are each attached directly to separate carbon atoms in the aromatic ring, and wherein the carbon atoms of each pair of carbonyl groups are attached to adjacent carbon atoms in the aromatic ring, resulting in the formation of a five membered ring.

Examples of aromatic acid dianhydrides which may be used to prepare the polymers of this invention include: pyromellitic dianhydride; 2,3,6,7-naphthalene tetracarboxylic dianhydride; 3,4,3′,4′-diphenyltetracarboxylic dianhydride; bis(3,4-dicarboxyl phenyl) sulfone dianhydride; benzene-1,2,3,4-tetracarboxylic dianhydrdie; 1,1-bis(3,4-dicarboxyl phenyl)methane dianhydride; pyrazine-2,3,5,6-tetracarboxylic dianhydride; 1,1-bis(3,4-dicarboxy phenyl) ether dianhydride, and the like.

Examples of the ordered polyimides of this invention obtainable by the reaction of the above described azoaromatic diamines and aromatic acid dianhydrides and embraced by the general formulas previously shown include the following:

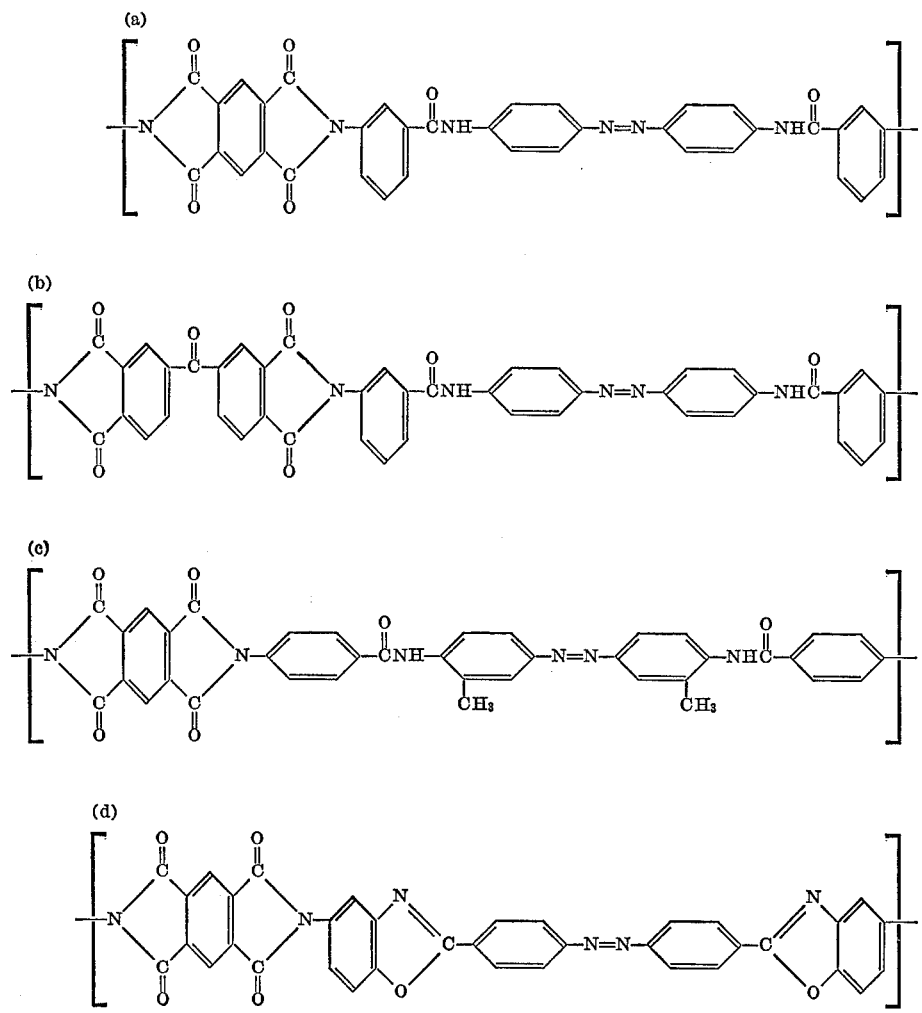

(e)

(f)

(g)

(h)

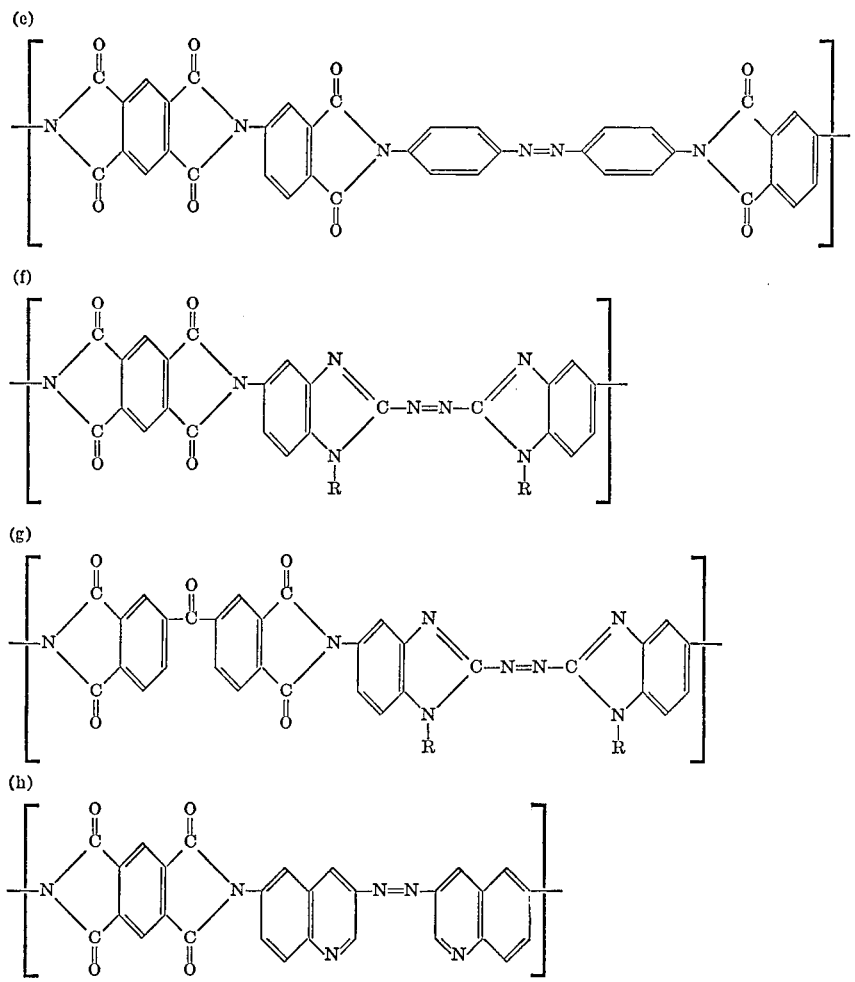

In a preferred method for the preparation of the polyimides of this invention, a polyamide-acid is first prepared by the reaction of at least one of the aforementioned diamines with at least one tetracarboxylic acid dianhydride in an organic solvent for at least one of the reactants, the solvent being inert to the reactants. Preferably, the reaction is carried out under substantially anhydrous conditions for a period of time and at a temperature sufficient to result in complete reaction. The polymerization reaction is very sensitive to the stoichiometric equivalence of the diamine and dianhydride and in order to obtain high molecular weight polyamide-acid, essentially equivalent molar amounts of the reactants should be used. For most purposes, the polyamide acid should have an inherent viscosity of at least 0.1, and preferable above 0.3–0.5, as measured as a 0.5% solution at 30° C. in suitable solvent, for satisfactory conversion to the polymers of this invention. Otherwise stated the number of repeat or recurring units in the polymer chain should reflect viscosities sufficient to enable the formation of fibers, films and other shaped articles for which the polymers find use.

The polyamide acid may then be converted to the corresponding polyimide by a heat treatment or chemically by treatment with any of the dehydrating systems used for such purposes, such as, for example, acetic anhydride in pyridine. It is generally preferable to form the desired shaped structure from the polyamide acid composition prior to conversion to the polyimide. However, a partial conversion to the polyimide structure, prior to forming the shaped article, is sometimes desirable and preferable. It has been found that a reaction product containing a polymeric component of at least 50% polyamide-acid will usually be sufficient to give a shapable composition.

The solvents useful for synthesizing the intermediate polyamide-acid compositions in the preferred method for preparing the polyimides of this invention must not react with either of the reactants (i.e. diamine or dianhydride) to any appreciable extent. Besides being inert to the reactants, and preferably being a solvent for the product, the organic solvent used must be a solvent for at least one and preferably both of the reactants. The preferred solvents are the lower molecular weight members of the N,N-dialkylcarboxylamide class such as for example N,N-dimethylformamide, N,N-dimethylacetamide and N,N-diethylformamide. Other suitable solvents which may be use are dimethylsulfoxide, dimethylsulfone, hexamethylphosphoramide, N-methyl-2-pyrrolidone and formamide. The solvents may be used alone, or in combinations of two or more solvents. The preferred solvents may also be used in combination with poor solvents such as benzene or hexane, in some cases, without any adverse effect on the results.

The optimum time and temperature for forming the polyamide-acid of a specified diamine and dianhydride will depend on a number of factors, such as temperature, solvent used, and the concentration and solubility of the reactants and product. For best results, it is generally preferable to carry out the reaction at a temperature close to the maximum permissible for the given system. The maximum permissible temperature will depend on a number of factors among which are the diamine and dianhydride used, the solvent, the concentration of polyamide-acid desired in the final composition, and the minimum time desired for completion of the reaction. The optimum temperature will vary with the reactants and other conditions but may be easily determined experimentally. In order to obtain the maximum degree of polymerization for any given combination of diamine and dianhydride, it has been found that the temperature should be maintained below 60° C. and preferably below 50° C. during the reaction.

Since the reaction is exothermic and tends to accelerate rapidly, it is sometimes necesary, particularly in the case of large scale preparations, to regulate the rate of polymerization in order to maintain the reaction temperature at the desired level. A relatively simple means for providing control of the temperature and rate of the reaction, involves pre-mixing equimolar amounts of the diamine and dianhydride and then adding this mixture in small increments with agitation to the solvent. Alternatively, the diamine may be dissolved in the solvent and the dianhydride added in small amounts and at a rate which permits control of the reaction. Or the diamine may be dissolved in one portion of solvent, the dianhydride in another portion of the same or another solvent and the polymerization controlled by mixing the two solutions at the required rate and stirring.

The quantity of solvent used may vary from the minimum amount needed to dissolve enough of the diamine to initiate the reaction, to an amount which will result in very dilute polymer solutions. The final concentration of polymer in solvent may vary over a considerable range and will depend on the requirements for forming the shaped articles, the degree of polymerization and the amount of polyamide-acid in the composition. For best results, the solution may contain from 1% to 40% of the polymeric component. A concentration of about 5% to 15% is generally best for fiber formation, whereas a concentration of 40% to 50% may be required for best results in forming shaped articles such as bearings or gears from these compositions.

The degree of polymerization of the polyamide-acid may be easily controlled and maintained at the desired level, by properly adjusting the stoichiometry of the reaction. Very high molecular weight polymers may be obtainable by using equal molar amounts of the reactants; whereas the use of an excess of either reactant limits the molecular weight obtainable.

As previously mentioned, the polyamide-acids of this invention may be converted to the corresponding polyimide by a heat treatment or by a chemical treatment. Heating may be carried out at temperatures above 50° C. and, preferably above 100° C., for periods of from several minutes to several hours. Heating serves to convert pairs of amide and carboxylic acid groups to polyimide groups by the elimination of water. The optimum time-temperature conditions for conversion of a given polyamide-acid to the corresponding polyimide will depend on the structure of the polyimide. These conditions may be readily determined by a few well chosen experiments. It has been found that after completion of the conversion at lower temperatures, the thermal and hydrolytic stability of most of these polyimides may be improved by a further treatment at 300–500° C. for 10–20 seconds.

The polyamide-acid polymers may also be converted to polyimides by a chemical treatment which usually involves treating the polymer with a dehydrating agent alone, or preferably in combination with a catalyst. For example, polyamide-acid films may be treated in a bath containing an acetic anhydride-pyridine mixture. The ratio of acetic anhydride to pyridine, as well as the temperature of treatment may vary over a wide range. Other dehydrating agents which may be used include propionic anhydride and butyric anhydride; and other catalysts which may be used include other tertiary amines such as triethylamine and quinoline. In some cases, it may be preferable to carry out the conversion to polyimides by a combination of a heat treatment and a chemical treatment. For example, partial conversion may be attained by a chemical treatment and the conversion then completed by a subsequent heat treatment or vice versa.

Shaped articles, derived from these polymers, possess excellent properties at room temperature and display a resistance toward various types of degradation that is unique for an organic polymer. The outstanding characteristic of shaped articles, derived from these polymers, however, is the retention of their electrical and physical properties as well as stability, on exposure to elevated temperatures for prolonged periods of time.

The polymers of this invention may be used in a wide variety of applications, either alone, such as, for example in coatings, films, fibers, foams or resins; or in combination with other materials, such as, for example in reinforced plastics, laminated structures, composites, etc.

Solutions of the polyamide-acids of this invention may be applied as a coating composition to a wide variety of materials such as metals, glass, wood, paper and synthetic polymers, in the form of wires, sheets, fibers, foams, fabrics, etc. The coatings may be then converted to polyimide coatings by one of the methods previously described. Because of their excellent electrical properties and heat resistance, these polymers may be especially useful as electrical coatings.

Solutions of the polyamide-acids of this invention may also be spun into fibers or filaments by conventional dry or wet spinning techniques and subsequently converted into polyimides by a chemical or heat treatment. In fiber form, the polymers of this invention may be especially useful for high temperature electrical insulation; protective clothing and filtration media.

Films of varying thickness may be cast from the polyamide-acid solutions of this invention using well known procedures. These films can then be converted into polyimide films by one of the previously described techniques. The films can be used in wrapping and packaging applications, such as for wrapping corrosion resistant pipe and cables, container linings, and protective bags, for high temperature insulation such as in transformers, capacitors, and motors; for laminated structures, such as metal sheets or strips and flat wire; and for electrical printed circuits. The moderately high dielectric constant and low dissipation factor make these films especially useful as high temperature dielectric materials.

Foams, derived from the polymers of this invention, may be prepared by introducing blowing agents, air, or carbon dioxide into the polyamide-acid polymer solutions with vigorous agitation and subsequently adding a converting agent or catalyst. The mixture may then be shaped into the desired form by casting on a smooth surface or placing in a mold, and then converted to a polyimide foam by drying and heating. Typical uses of the foamed products derived from the polymers of this invention are in various types of insulation for appliances, heat shields, firedoors, etc.; in laminating other materials; in films, and other uses requiring a combination of good dielectric properties and flame resistance.

Resins may be prepared from these polymers, which may be useful in the fabrication of gaskets, piston rings; bearings, and as a binder, due to their high abrasion resistance and resistance to creep and cold flow.

It should be understood that the polymers of this invention may be mixed with other inert materials prior to shaping, in which case they make excellent binders for composite structures.

It is important that the Ar radicals in the general formula describing the novel polymers herein are each asymmetrical and are mirror images of each other. That is to say, that the Ar radicals extending from the azo radical have a mirror-image relationship to each other. With reference to general formula (a) above, for example, one Ar radical is

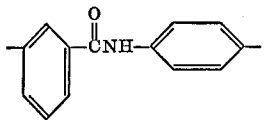

and the other Ar radical is

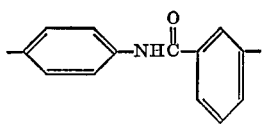

It is noted that neither Ar is symmetrical and that one Ar has its molecular structure so arranged as to present a reversal of the arrangement of the other Ar. Using the azo radical as an intervening axis, it is seen that the structure of one Ar is the mirror image of the other. The mirror-image relationship of the Ar radicals is important in the realization of optimum properties in filaments prepared from the polymer. Extraordinarily high modulus values and tenacities are obtainable in such filaments.

The following examples illustrate several embodiments of the invention and are not intended to define the limits and scope thereof.

Example I

Preparation of monomer:

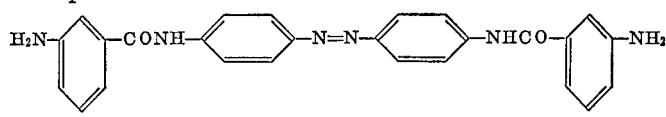

Cuprous chloride (1.0 g.) was oxidized with oxygen in a mixture of 120 ml. of DMAc and 30 ml. of pyridine. Then, 13.62 g. (0.06 mole) of 3,4'-diaminobenzanilide was added. The reaction mixture absorbed 761 ml. of oxygen in 250 min. at 0° C.; at this point oxygen absorption had essentially ceased. The precipitated product was isolated by filtration. Yield: 10.6 g. (78%) of yellow material by recrystallization from DMAc a yellow diamines was obtained; M.P.—316–318° C.

Analysis.—$C_{26}H_{22}N_6O_2$: Theory (percent): C, 69.3; H, 4.89; N, 18.7. Found (percent): C, 68.5; H, 5.08; N, 18.3.

Preparation of polymer: Pyromellitic dianhydride (0.545 g., 0.0025 mole) was added at 0° C. to a slurry of 1.125 g. (0.0025 mole) of N,N'-bis(m-aminobenzoyl)-4,4'-diaminoazobenzene in 15.9 ml. of dimethyl acetamide (DMAc). The mixture was stirred for 2 hours. at 0° C., for 47 hours at room temperature. The resulting polymer had an inherent viscosity (0.5% solution in DMAc, 30° C.) of 1.28. Clear, strong and flexible polyimide films were prepared from the dope by conventional techniques (curing at 300° C. for 1 hour). A film of this composition remained flexible upon exposure to air at 300° C. for 15 days. The polymer is represented by recurring units having the following formula:

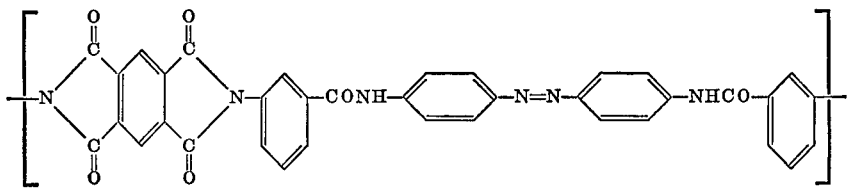

Example II 3,3'-,4,4'-benzophenone tetracarboxylic acid dianhydried (0.805 g., 0.0025 mole) was added at 0° C. to a slurry of 1.125 g. (0.0025 mole) of N,N'-bis(m-aminobenzoyl)-4,4'-diaminoazobenzene in 12.6 ml. of DMAc. The reaction mixture was stirred for 2 hrs. at 0° C., 45 hrs. at room temperature. The resulting polymer had an inherent viscosity (0.5% solution in DMAc, 30° C.) of 0.83. Clear, strong, flexible films were obtained from the dope by conventional techniques. A film sample remained flexible upon exposure to air at 300° C. for 54 days. The polyimide thus prepared is represented by recurring units having the following formula:

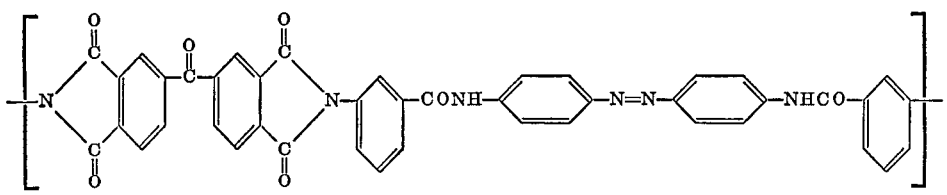

Example III

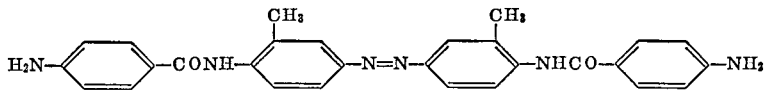

Cuprous chloride (1.0 g.) was oxidized with oxygen in a mixture of 80 ml. of DMAc and 20 ml. of pyridine. Then, 9.08 g. (0.038 mole) of 4,4'-diamino-2'-methylbenzanilide were added. In 3 hrs. the reaction mixture absorbed 445 ml. of $O_2$ (theory: 460 ml. of $O_2$ at 25° C.) at 25° C. The precipitated product was isolated by filtration. A yellow diamine (8.4 g.) was obtained, M.P.— 322–323° C.

Analysis.—$C_{28}H_{26}N_6O_2$: Theory (percent): C, 70.3; H, 5.44; N, 17.6. Found (percent): C, 70.0; H, 5.86; N, 17.6.

Preparation of polymer: Pyromellitic dianhydride (0.545 g., 0.0025 mole) was added to a solution of 1.125 g., (0.0024 mole) of N,N'-bis(p-aminobenzoyl)-4,4'-diamino-3,3'-dimethylazobenzene in 10.9 ml. of DMAc. The reaction mixture was stirred for 2 hrs. at 0° C., 18 hrs. at room temperature. The resulting polymer had an inherent viscosity (0.5% solution in DMAc, 30° C.) of 1.65. Strong, flexible polyimide films were prepared from the dope by conventional techniques (curing with pyridine/acetic anhydride (3/2)). A film sample remained flexible upon exposure to air at 300° C. for 13 days. The polyimide thus prepared is represented by recurring units having the following formula:

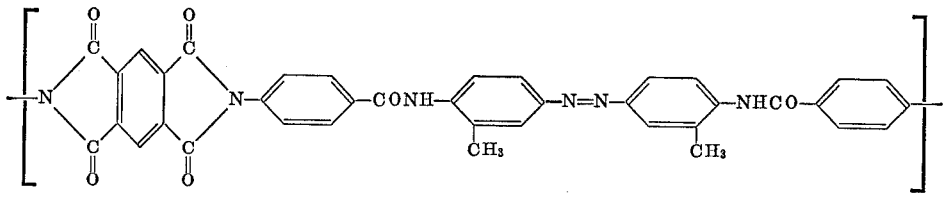

Example IV

Preparation of monomer:

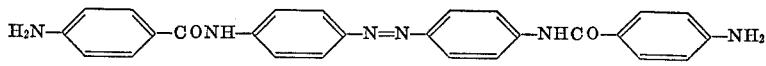

Cuprous chloride (1.6 g.) was oxidized with oxygen in a mixture of 80 ml. of dimethylacetamide (DMAc) and 20 ml. of pyridine. Then, 9.1 g. (0.04 mole) of 4,4'-diaminobenzanilide was added. The stirred reaction mixture absorbed 509 ml. of oxygen in 70 min. at 27–29° C. with 489 ml. of oxygen being absorbed in the first 16 min. (theory for dimerization: 489 ml. of $O_2$ at 25° C.) at which time the reaction essentially stopped. The product was isolated by precipitation of the reaction mixture with aqueous ammonia. Yield: 9.0 g. (99%) of yellow material. By reprecipitation from dimethylformamide with water a yellow diamine was obtained; M.P.—342–344° C.

Analysis.—$C_{26}H_{22}N_6O_2$: Theory (percent): C, 69.3%; H, 4.98; N, 18.7. Found (percent): C, 68.6; H, 4.92; N, 18.7.

Polymer preparation: Pyromellitic dianhydride (0.545 g., 0.0025 mole) was added at 0° C. to a slurry of 1.125 g., (0.0025 mole) of N,N'-bis(p-aminobenzoyl)-4,4'-diaminozobenzene in 11.4 ml. of DMAc. The reaction mixture was stirred for 2 hrs. at 0° C., then at room temperature. During the polymerization, the dope was diluted by addition of 34 ml. of DMAc to avoid excessive dope viscosity. The poly(amic acid) formed had an inherent viscosity (0.5% solution in DMAc, 30° C.) of 4.3. Clear, strong flexible films were prepared from the dope (curing at 300° C. for 2hrs.). The polyimide thus prepared is represented by recurring units having the following formula:

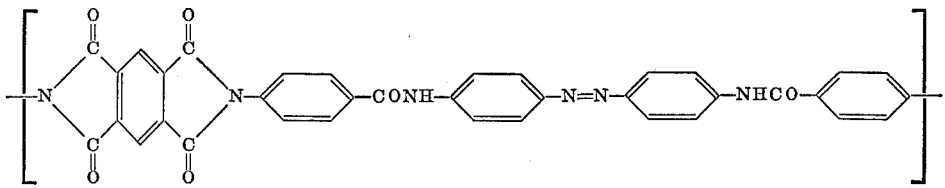

I claim:
1. An ordered fiber-forming polymer of the formula:

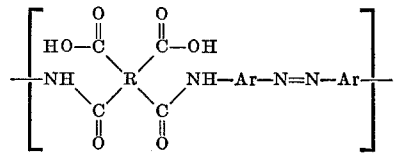

wherein R is selected from the group of

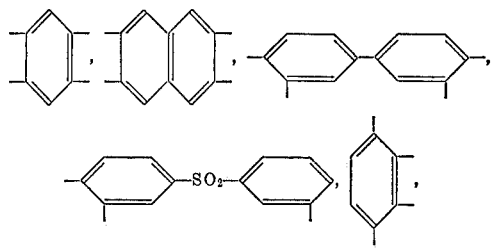

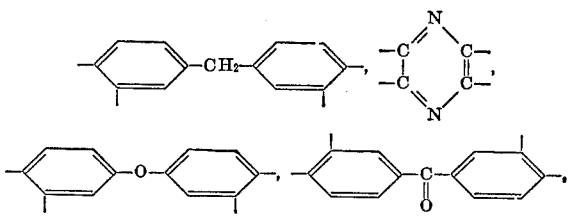

and wherein Ar is an asymmetrical diavalent aromatic radical with one Ar being the mirror image of the other Ar and selected from the group of

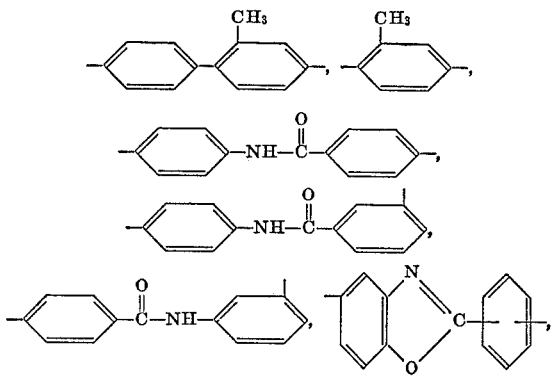

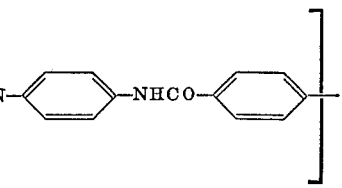

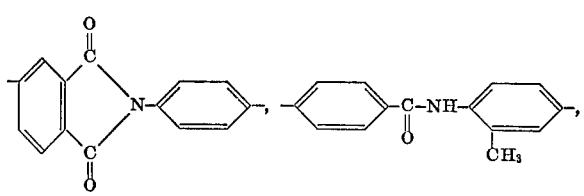

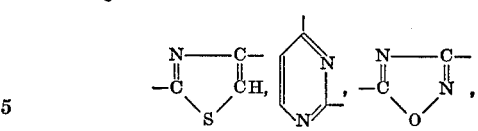

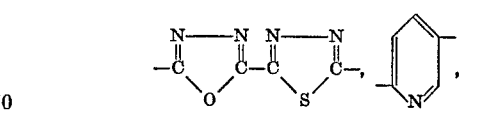

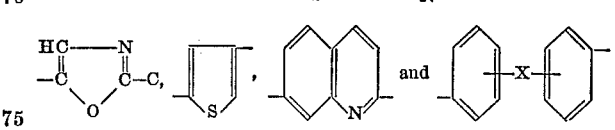

wherein X is selected from the group of
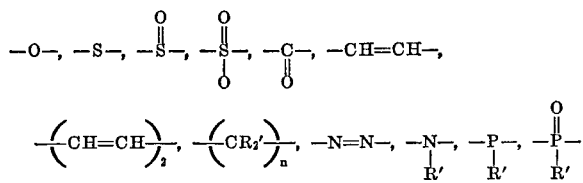
wherein R' is hydrogen or lower alkyl and $n$ is an integer of 1–6.
References Cited
UNITED STATES PATENTS
| | | | |
|---|---|---|---|
| 2,746,954 | 5/1954 | Grandjean et al. | 260—144 X |
| 2,994,693 | 8/1961 | Blake et al. | 260—144 |
| 3,249,588 | 5/1966 | Gall | 260—78 X |
| 3,278,486 | 10/1966 | Meek et al. | 260—144 X |
| 3,310,506 | 3/1967 | Amborski et al. | 260—78 X |
| 3,356,648 | 12/1967 | Rogers | 260—78 X |
| 3,403,200 | 9/1968 | Randall | 260—144 X |
| 3,501,444 | 3/1970 | Bach | 260—78 |
| 3,518,219 | 6/1970 | Lavin et al. | 260—78 X |
| 3,520,837 | 7/1970 | Wilson | 260—78 X |
| 3,437,636 | 4/1969 | Angelo | 260—47 |
| 3,455,879 | 7/1969 | Gay et al. | 260—47 |
| 3,597,392 | 8/1971 | Bach et al. | 260—47 CP |
FLOYD D. HIGEL, Primary Examiner
U.S. Cl. X.R.
117—124 E, 128.4, 132 B, 148, 155 R; 161—227; 260—2.5 N, 30.2, 30.6 R, 30.8 R 30.8 DS, 32.6 N, 47 CZ, 65, 78 TF, 152, 154, 155, 156, 157, 158, 207.1, 546